(12) United States Patent
Yamauchi

(10) Patent No.: US 10,527,409 B2
(45) Date of Patent: Jan. 7, 2020

(54) ARITHMETIC DEVICE, AND METHOD OF CONTROLLING ARITHMETIC DEVICE

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/352,275

(22) Filed: Mar. 13, 2019

(65) Prior Publication Data

US 2019/0285402 A1 Sep. 19, 2019

(30) Foreign Application Priority Data

Mar. 14, 2018 (JP) .................. 2018-046322

(51) Int. Cl.
*G01B 11/30* (2006.01)
*G01B 11/25* (2006.01)

(52) U.S. Cl.
CPC .................. *G01B 11/25* (2013.01)

(58) Field of Classification Search
CPC .............................. G01B 11/25–30
USPC .............................. 356/600–612
See application file for complete search history.

(56) References Cited

U.S. PATENT DOCUMENTS

| | | | |
|---|---|---|---|
| 10,302,422 B2 * | 5/2019 | Inukai | B25J 9/1612 |
| 2005/0254066 A1 | 11/2005 | Mamiya et al. | |
| 2007/0115484 A1 * | 5/2007 | Huang | G01B 11/2527 356/604 |
| 2014/0063192 A1 * | 3/2014 | Sonoda | G01B 11/2513 348/46 |
| 2015/0192407 A9 * | 7/2015 | Tohme | G01S 17/003 348/47 |
| 2015/0271466 A1 * | 9/2015 | Yamazaki | G06K 9/4661 348/46 |
| 2016/0364874 A1 * | 12/2016 | Tohme | G01S 17/003 |
| 2016/0370171 A1 * | 12/2016 | Bridges | G01S 17/003 |
| 2018/0315205 A1 * | 11/2018 | Moribe | G01B 11/2504 |

FOREIGN PATENT DOCUMENTS

| | | |
|---|---|---|
| JP | H11-211443 A | 8/1999 |
| JP | 2003-279329 A | 10/2003 |
| JP | 2008-185370 A | 8/2008 |
| JP | 2009-115612 A | 5/2009 |
| JP | 2014-059239 A | 4/2014 |
| JP | 2015-038777 A | 2/2015 |
| WO | 2003/073044 A1 | 9/2003 |

* cited by examiner

*Primary Examiner* — Sunghee Y Gray
(74) *Attorney, Agent, or Firm* — Oliff PLC

(57) ABSTRACT

An arithmetic device includes an imaging section adapted to take an image of the measurement object, a relative phase calculation section adapted to calculate a relative phase, and a projection control section adapted to perform a first pattern projection and a second pattern projection, and the relative phase calculation section adapted to obtain a grayscale image of a measurement object on which light is projected due to the first pattern projection and a grayscale image of the measurement object on which light is projected due to the second pattern projection from the imaging section to calculate the relative phase using the grayscale images obtained.

3 Claims, 15 Drawing Sheets

ARITHMETIC DEVICE, AND METHOD OF CONTROLLING ARITHMETIC DEVICE

BACKGROUND

1. Technical Field

The present invention relates to a technology for calculating a relative phase.

2. Related Art

In the past, there has been known a phase shift method as a method of measuring a three-dimensional shape of a measurement object (e.g., JP-A-2009-115612 (Document 1) and JP-A-2014-59239 (Document 2)).

In the phase shift method, a projection pattern as a stripe pattern varying in luminance in a sinusoidal manner is projected on the measurement object just a plurality of times to obtain the unknown using a plurality of images of the measurement object on which the projection pattern is projected.

For example, the projection performs four times while shifting the projection pattern by $\pi/2$ to obtain grayscale images of the measurement object on which the projection pattern is projected. The luminance values of the grayscale images taken by one pixel of an imaging section are expressed by Formula 1 through Formula 4 described below. In Formula 1 through Formula 4 described below, the symbols I1 through I4 each represent the luminance value of the image taken by a certain pixel of the imaging section, the symbol A represents the amplitude of the luminance (a projection pattern), the symbol $\phi$ represents the relative phase, the symbol G represents the background luminance (global ambient), and the symbol M represents the object reflectance.

Formula 1
$$I1 = \{A \times \cos(\phi) + G\} \times M \quad (1)$$

Formula 2
$$I2 = \left\{A \times \cos\left(\phi + \frac{\pi}{2}\right) + G\right\} \times M \quad (2)$$

Formula 3
$$I3 = \{A \times \cos(\phi + \pi) + G\} \times M \quad (3)$$

Formula 4
$$I4 = \left\{A \times \cos\left(\phi + \frac{3\pi}{2}\right) + G\right\} \times M \quad (4)$$

The relative phase $\phi$ is obtained from Formula 5 described below using Formula 1 through Formula 4 described above.

Formula 5
$$\phi = \tan^{-1}\left(\frac{I4 - I2}{I1 - I3}\right) \quad (5)$$

The relative phase $\phi$ thus obtained takes a value in each period of the striped projection pattern, namely a value in a range of $-\pi$ through $\pi$. Therefore, in order to obtain an absolute phase of each stripe projected in the plurality of phases, there is estimated a fringe order n. As an estimation method of the fringe order n, there are known, for example, the technologies disclosed in Document 1 and Document 2. The absolute phase is obtained using the relative phase $\phi$ and the fringe order n thus estimated. A line (an equiphase line) obtained by connecting points equal in absolute phase to each other shows a shape of a cross-section obtained by cutting the measurement object with a certain plane similarly to a section line in the light-section method. Therefore, on the basis of the absolute phase, the three-dimensional shape (depth information in each point of the image) of the measurement object is measured due to the principle of triangulation based on an optical positional relationship between the imaging section and the projection section.

In the existing phase shift method, in order to obtain the relative phase $\phi$, it is necessary to project the projection pattern on the measurement object while shifting the phase just at least three times (normally four times as described above). Therefore, the calculation time for obtaining the relative phase $\phi$ becomes long in some cases. In the case in which the calculation time has become long, the illuminance of the outside light illuminating the measurement object varies, or the measurement object moves during the measurement in some cases, there can occur the case in which the calculation accuracy deteriorates. Therefore, in the past, there has been demanded the technology capable of reducing the calculation time for obtaining the relative phase $\phi$.

SUMMARY (1) According to an aspect of the invention, an arithmetic device comprising a projection section adapted to project light of a projection pattern having a sinusoidal luminance variation on a measurement object, a projection control section adapted to control an operation of the projection section, an imaging section adapted to take an image of the measurement object, and a relative phase calculation section adapted to calculate a relative phase of the projection pattern at an arbitrary position in a grayscale image of the measurement object on which the light of the projection pattern is projected, the grayscale image being taken by the imaging section, wherein the projection control section performs first pattern projection adapted to cause the projection section to project a first pattern and a second pattern as the projection pattern having phases in a spatial frequency shifted by $\pi$ from each other alternately in a first time period, and second pattern projection adapted to cause the projection section to project a third pattern and a fourth pattern as the projection pattern having phases in the spatial frequency shifted by $\pi/2$ from the first pattern and the second pattern, the phases of the third pattern and the fourth pattern being shifted by $\pi$ from each other, alternately in a second time period longer than the first time period, the projection control section performs the first pattern projection between projection of the third pattern and the fourth pattern in a certain period and projection of the third pattern and the fourth pattern in a subsequent period, and the relative phase calculation section obtains a grayscale image of the measurement object on which the light is projected due to the first pattern projection and a grayscale image of the measurement object on which the light is projected due to the second pattern projection from the imaging section to calculate the relative phase using the grayscale images obtained is provided.

(2) According to another aspect of the invention, a method for controlling an arithmetic device including a projection section adapted to project light of a projection pattern having a sinusoidal luminance variation on a measurement object, and an imaging section adapted to take an image of the measurement object is provided. According to the method, calculating a relative phase of the projection pattern at an arbitrary position in a grayscale image of the measurement object on which the light of the projection pattern is projected, the grayscale image being taken by the imaging section, and performing (i) first pattern projection adapted to cause the projection section to project a first pattern and a second pattern as the projection pattern having phases in a spatial frequency shifted by $\pi$ from each other alternately in a first time period, and (ii) second pattern projection adapted to cause the projection section to project a third pattern and a fourth pattern as the projection pattern having phases in the spatial frequency shifted by $\pi/2$ from the first pattern and the second pattern, the phases of the third pattern and the fourth pattern being shifted by $\pi$ from each other, alternately in a second time period longer than the first time period, wherein the performing (i) the first pattern projection and (ii) the second pattern projection includes performing the first pattern projection between projection of the third pattern and the fourth pattern in a certain period and projection of the third pattern and the fourth pattern in a subsequent period, and the calculating the relative phase includes obtaining a grayscale image of the measurement object on which the light is projected due to the first pattern projection and a grayscale image of the measurement object on which the light is projected due to the second pattern projection from the imaging section to calculate the relative phase using the grayscale images obtained is performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
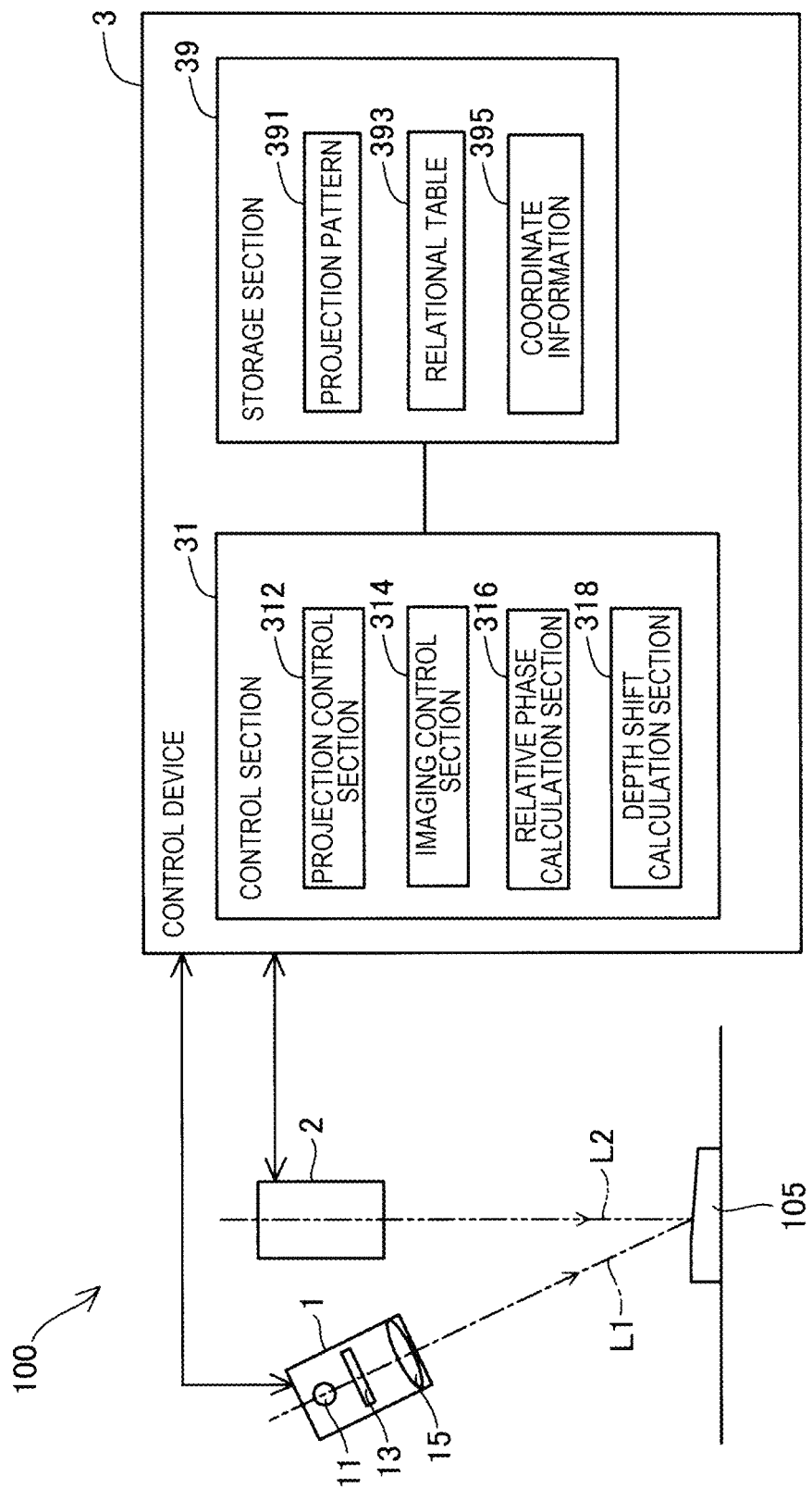
FIG. 1 is a diagram for explaining an arithmetic device as a first embodiment of the invention.
Figure 2:
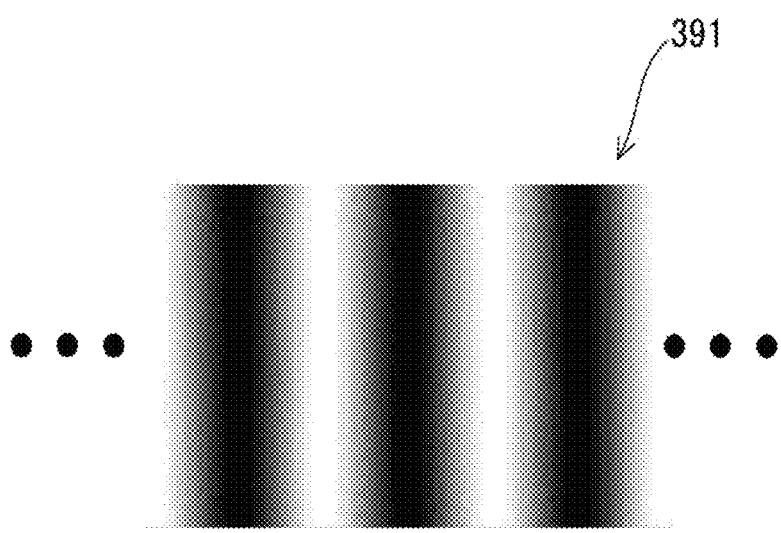
FIG. 2 is a diagram for explaining a projection pattern to be projected on a measurement object by a projection section.

FIG. 1 is a diagram for explaining an arithmetic device 100 as a first embodiment of the invention. FIG. 2 is a diagram for explaining a projection pattern 391 to be projected on a measurement object 105 by a projection section 1. The arithmetic device 100 (FIG. 1) is a device for measuring a relative three-dimensional shape of the measurement object 105. The arithmetic device 100 is provided with the projection section 1, an imaging section 2 and a control device 3.

The projection section 1 is a liquid crystal projector. The projection section 1 has a light source 11, a liquid crystal panel 13 and a lens 15. As the light source 11, there can be adopted a variety of types of light sources such as alight emitting diode or a laser diode besides a light source lamp such as a super-high pressure mercury lamp. As the liquid crystal panel 13, it is possible to use either of a transmissive type and a reflective type, and it is also possible to adopt a configuration provided with a plurality of liquid crystal panels 13 for respective colored light beams. The lens 15 converges light having passed through the liquid crystal panel 13 on a surface of the measurement object 105. The projection section 1 projects light of the projection pattern 391 (FIG. 2) of a stripe pattern having a sinusoidal luminance variation on the measurement object 105.

The imaging section 2 is a camera for taking an image of the measurement object 105. The imaging section 2 is provided with a solid-state imaging element such as a CCD or a CMOS, an optical system for forming an image of the measurement object 105 on an imaging surface of the solid-state imaging element, and a signal processing section for performing signal processing on the output of the solid-state imaging element to obtain luminance (a concentration value) of each pixel. The imaging section 2 takes an image of the measurement object 105 to generate a grayscale image. The grayscale image is an image having monochrome shading.

An imaging direction (the optical axis direction) L2 of the imaging section 2 and a projection direction (the optical axis direction) L1 of the projection section 1 are different from each other. A positional relationship (e.g., a distance) between the imaging section 2 and the projection section 1 is determined in advance. Further, due to stereo calibration, a coordinate correspondence relationship (a coordinate conversion formula) between the coordinate system of the imaging section 2 and the coordinate system of the projection section 1 is determined in advance. The positional relationship and the coordinate correspondence relationship are stored in a storage section 39 described later as a relational table 393.

The control device 3 has a control section 31 and the storage section 39. The storage section 39 is formed of a nonvolatile memory such as a flash memory or an EEPROM. The storage section 39 stores the projection pattern 391, the relational table 393 and coordinate information 395 in addition to a variety of programs to be executed by the control section 31. The projection pattern 391 (FIG. 2) is a pattern as the stripe pattern having the sinusoidal luminance variation. The relational table 393 is a table for defining the positional relationship and the coordinate correspondence relationship between the imaging section 2 and the projection section 1 as described above. The coordinate information 395 is coordinate information (three-dimensional coordinate information) in the absolute coordinate system of the measurement object 105, which is calculated from a reference image as a grayscale image of the measurement object 105 imaged by the imaging section 2. The reference image is a taken image of the measurement object 105 on which the light having an arbitrary pattern is projected by the projection section 1. It is only required for the arbitrary pattern to be a pattern in which the absolute coordinate system can be calculated, and it is also possible to adopt, for example, the projection pattern 391, or other patterns such as a black-and-white grid-like pattern.

The control section 31 controls operations of the arithmetic device 100. The control section 31 has a projection control section 312, an imaging control section 314, a relative phase calculation section 316, and a depth shift calculation section 318 as a function of the program stored in the storage section 39.

The projection control section 312 controls operations of the projection section 1. For example, the projection control section 312 causes the projection section 1 to project the light of the projection pattern 391 on the measurement object 105. Specifically, the projection control section 312 performs first pattern projection and second pattern projection to thereby cause the projection section 1 to project the light of the projection pattern 391 on the measurement object 105 for the calculation of a relative phase $\phi$. The details of the first pattern projection and the second pattern projection will be described later. The imaging control section 314 controls operations of the imaging section 2. For example, the imaging control section 314 causes the imaging section 2 to take an image of the measurement object 105 on which the light of the projection pattern 391 is projected at the timing described later. The grayscale image taken by the imaging section 2 is stored in the storage section 39.

The relative phase calculation section 316 calculates the relative phase $\phi$ of the projection pattern 391 at an arbitrary position in the grayscale image of the measurement object 105 on which the light of the projection pattern 391 is projected, the grayscale image being taken by the imaging section 2.

Using the coordinate information 395 and the relative phase $\phi$ calculated by the relative phase calculation section 316, the depth shift calculation section 318 calculates a shift amount (a relative three-dimensional shape) of the depth of the measurement object 105 when the relative phase $\phi$ is calculated with respect to the measurement object 105 in the case in which the reference image is obtained. The expression "when the relative phase $\phi$ is calculated" means the timing when the imaging section 2 takes an image of the measurement object 105 on which the light of a second pattern 391b to be projected in the latter half of the first pattern projection out of the projection of a set of patterns, namely a first pattern 391a and the second pattern 391b.

Figure 3:
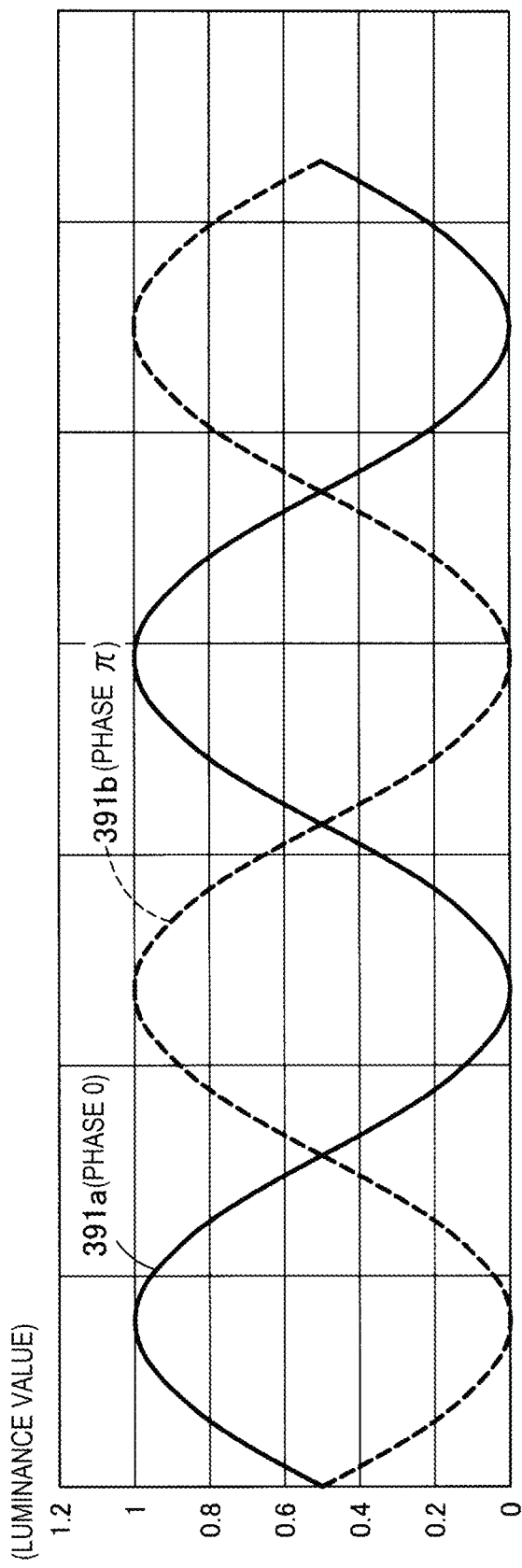
FIG. 3 is a diagram showing a projection pattern to be projected on the measurement object due to first pattern projection.
Figure 4:
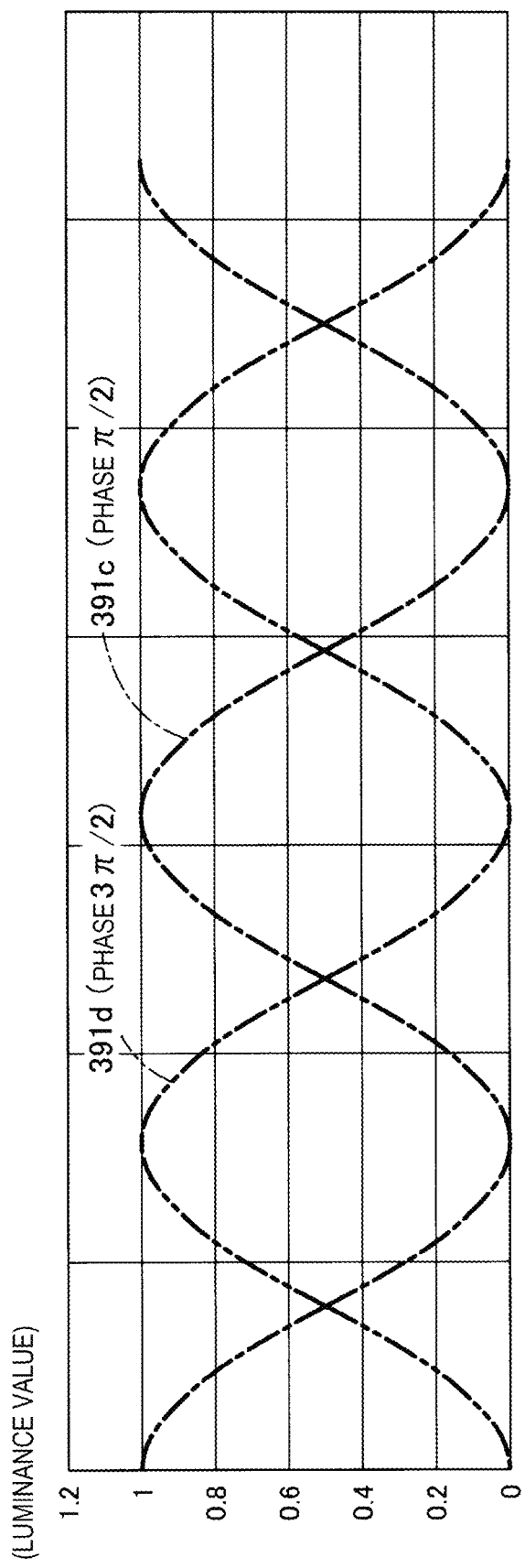
FIG. 4 is a diagram showing a projection pattern to be projected on the measurement object due to second pattern projection.
Figure 5:
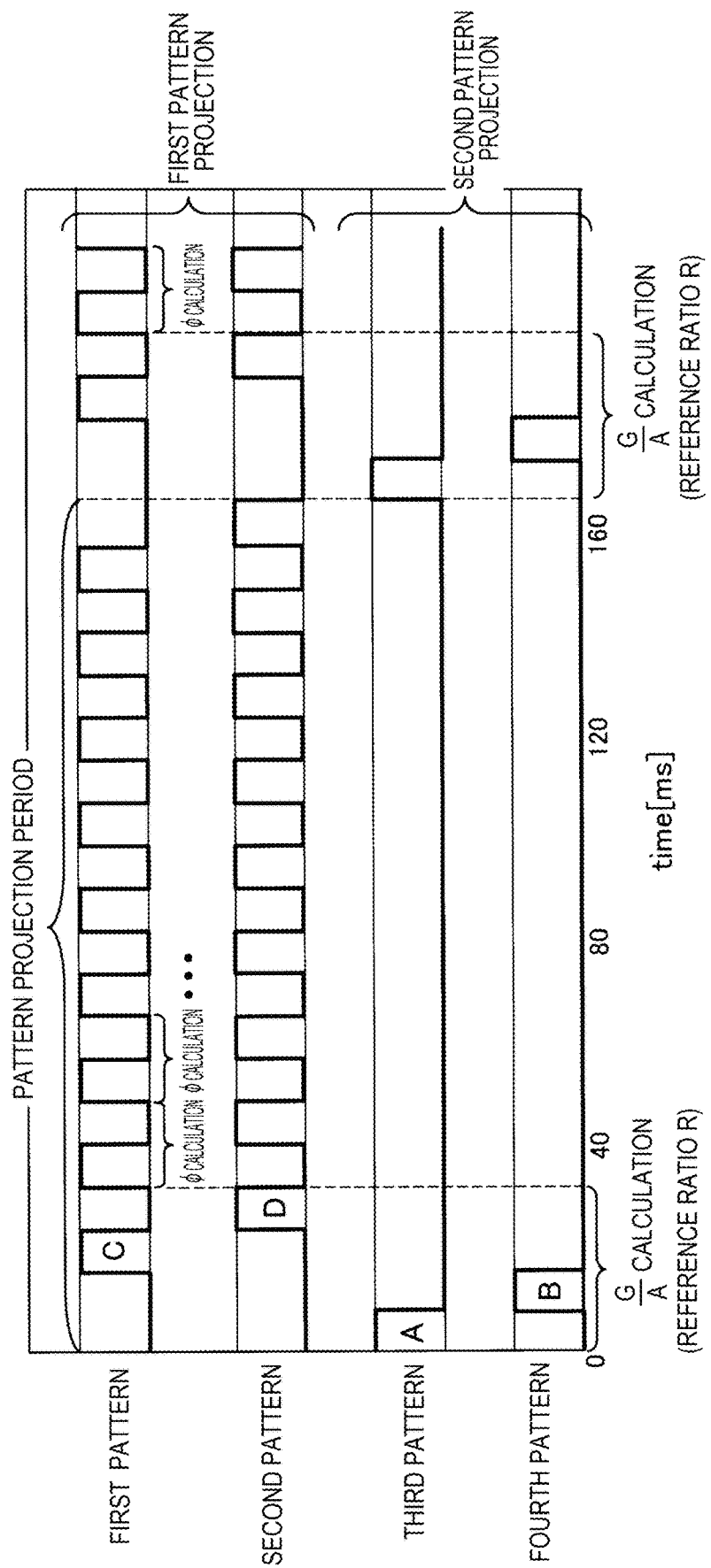
FIG. 5 is a projection timing chart due to the first pattern projection and the second pattern projection.

FIG. 3 is a diagram showing a projection pattern to be projected on the measurement object 105 due to the first pattern projection. FIG. 4 is a diagram showing a projection pattern to be projected on the measurement object 105 due to the second pattern projection. FIG. 5 is a projection timing chart of the projection patterns 391a through 391d due to the first pattern projection and the second pattern projection.

As shown in FIG. 3, in the first pattern projection, the projection section 1 is made to project the first pattern 391a and the second pattern 391b as the projection pattern 391 having the phases in a spatial frequency shifted by $\pi$ from each other. As shown in FIG. 4, in the second pattern projection, the projection section 1 is made to project the third pattern 391c and the fourth pattern 391d as the projection pattern 391 shifted in phase by $\pi/2$ from the first pattern 391a and the second pattern 391b, respectively. Further, the third pattern 391c and the fourth pattern 391d are shifted in phase by $\pi$ from each other.

Further, as shown in FIG. 5, the first pattern projection is the control for causing the projection section 1 to alternately project the first pattern 391a and the second pattern 391b with a first time period. In the first pattern projection, in each period, the projection of the second pattern 391b is performed immediately after the termination of the projection of the first pattern 391a.

In the second pattern projection, the projection section 1 is made to alternately project the third pattern 391c and the fourth pattern 391d with a second time period longer than the first time period. In the second pattern projection, in each period, the projection of the fourth pattern 391d is performed immediately after the termination of the projection of the third pattern 391c. In the present embodiment, the first time period is $1/60$ second, and the second time period is $1/6$ second. Further, the projection time of each of the first pattern 391a through the fourth pattern 391d is $1/120$ second.

Further, the projection control section 312 performs the first pattern projection between the projection of the third pattern 391c and the fourth pattern 391d in a certain period and the projection of the third pattern 391c and the fourth pattern 391d in the subsequent period due to the second pattern projection.

The second time period is only required to be longer than the first time period, and is preferably N times (N is a natural number no smaller than 2) as long as the first time period. By adopting such a configuration, it is possible to easily perform the timing control of the projection by the projection control section 312. Further, it is preferable for the second time period to be a time period in which the fluctuation of the background luminance due to the sunlight is assumed to be roughly constant. For example, the second time period is preferably no more than 10 seconds, and more preferably no more than 1 second.

In the first pattern projection and the second pattern projection, the imaging control section 314 causes the imaging section 2 to take an image of the measurement object 105 on which the light of each of the patterns 391a through 391d is projected every time the light of the first pattern 391a through the fourth pattern 391d is projected on the measurement object 105 to generate the grayscale image.

Figure 6:
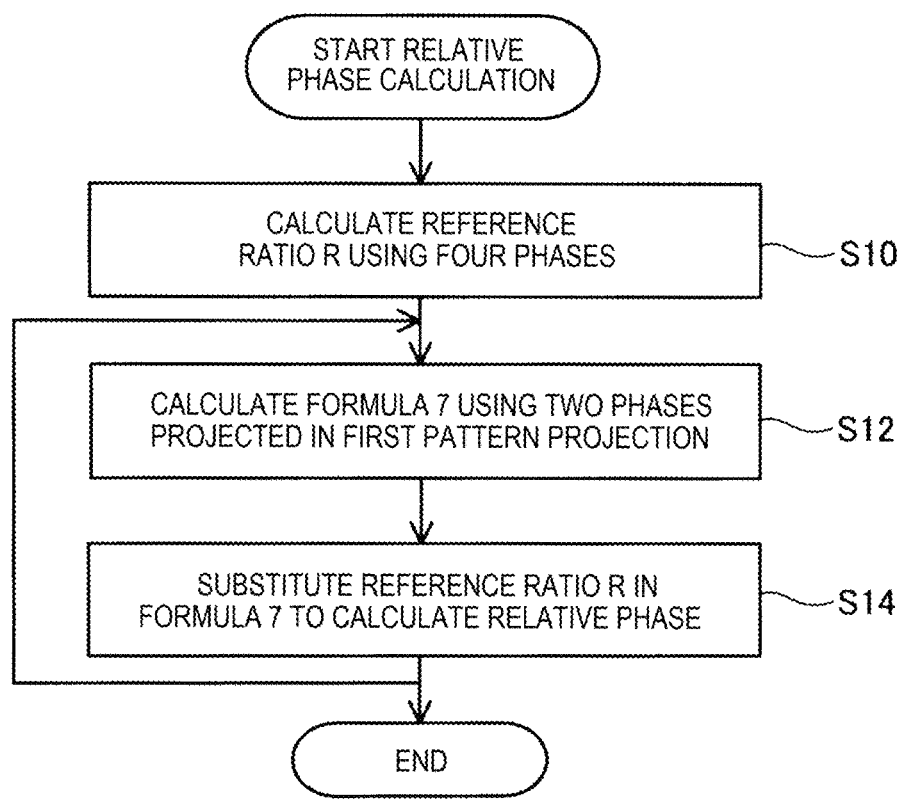
FIG. 6 is a flowchart showing a calculation process of a relative phase.

FIG. 6 is a flowchart showing a calculation process of the relative phase $\phi$ executed by the relative phase calculation section 316. This flowchart is executed repeatedly in each pattern projection period by the arithmetic device 100 receiving the input from the outside. The pattern projection period denotes the time period from the beginning of a certain period to the beginning of the subsequent period in the second pattern projection, and corresponds to the second time period.

When the calculation process of the relative phase $\phi$ is started, a reference ratio R (=(background luminance G)/(amplitude A)) is calculated (step S10) using the four phases, namely the first pattern 391a through the fourth pattern 391d. The relative phase calculation section 316 calculates the reference ratio R (=G/A) using Formula 6 described below derived from Formulas 1 through 4 described above in the step S10. Formula 6 does not include the object reflectance in the relational expression.

Formula 6

$$\frac{G}{A} = \left(\frac{I4 + I2}{I4 - I2}\right) \times \sin \phi \quad (6)$$

In Formula 6 described above, the amplitude A corresponds to the amplitude of the projection pattern 391 controlled by the projection control section 312. Further, luminance values I2, I4 in each pixel of the grayscale image in Formula 6 are luminance values of each pixel in the grayscale image in the case of projecting the light of the third pattern 391c and the fourth pattern 391d in the first projection in each pattern projection period on the measurement object 105. In other words, the luminance value I2 in Formula 6 described above corresponds to the luminance value of the grayscale image in the projection of the third pattern 391c. Further, the luminance value I4 in Formula 6 described above corresponds to the luminance value of the grayscale image in a projection B of the fourth pattern 391d. In other words, in the present embodiment, the relative phase calculation section 316 obtains four grayscale images of the measurement object 105 on which the light of the first pattern 391a through the fourth pattern 391d is sequentially projected in the first 4/120 second from the imaging section 2 in each pattern projection period. Then, the relative phase calculation section 316 calculates the reference ratio R (=G/A) using Formula 6 using two grayscale images shifted in phase by π from each other out of the four grayscale images thus obtained.

Then, the relative phase calculation section 316 calculates (step S12) Formula 7 described below using two phases, namely the first pattern 391a and the second pattern 391b, to be projected in the first pattern projection. Formula 7 can be obtained from Formula 1 and Formula 3 described above.

Formula 7

$$\phi = \cos^{-1}\left\{\frac{G}{A} \times \frac{(I1 - I3)}{(I1 + I3)}\right\} \quad (7)$$

A luminance value I1 and a luminance value I3 to be substituted in Formula 7 described above are the luminance values described below. That is, in the pattern projection period, the light of the first pattern 391a and the second pattern 391b is projected on the measurement object 105 in a time-series manner due to the first pattern projection as shown in FIG. 5. Then, the imaging section 2 is made to take an image of the measurement object 105 on which the light of the first pattern 391a and the second pattern 391b is projected. Then, the relative phase calculation section 316 obtains the two grayscale images in the first pattern 391a and the second pattern 391b taken by the imaging section 2, and then substitutes the luminance values of the grayscale images for the luminance values I1, I3 in Formula 7 described above pixel by pixel.

Then, by substituting the reference ratio R of Formula 6 calculated in the step S10 in Formula 7 calculated in the step S12, the relative phase ϕ is calculated (step S14) using Formula 8 described below.

Formula 8

$$\phi = \cos^{-1}\left[\left\{\frac{(I4 + I2)}{(I4 - I2)} \times \sin \phi\right\} \times \frac{(I1 - I3)}{(I1 + I3)}\right] \quad (8)$$

The step S12 and the step S14 are executed for each projection of the set of the first pattern 391a and the second pattern 391b in the pattern projection period. By completing the projection of all of the sets, the step S10 through the step S14 in the subsequent pattern projection period are executed. Specifically, in the present embodiment, the reference ratio R small in variation with time is calculated in advance using the grayscale images obtained by the first projection of the first pattern 391a through the fourth pattern 391d in each pattern projection period. Then, in the pattern projection period, the first pattern 391a and the second pattern 391b due to the first pattern projection are projected on the measurement object 105 in a time-series manner. Then, the measurement object 105 on which the light of the first pattern 391a is projected and the measurement object 105 on which the light of the second pattern 391b is projected are respectively imaged by the imaging section 2 to thereby generate two grayscale images. The relative phase calculation section 316 substitutes Formula 6 of the reference ratio R (=G/A) calculated first in Formula 8 calculated using the two grayscale images. Thus, it becomes possible to calculate the relative phase ϕ using the two phases, namely the first pattern 391a and the second pattern 391b, in the pattern projection period.

In the step S14, every time the relative phase ϕ is calculated, the depth shift calculation section 318 executes the following calculation. That is, using the relative phase ϕ thus calculated and the coordinate information 395 (FIG. 1) stored in the storage section 39, the depth shift calculation section 318 calculates the shift amount (the relative three-dimensional shape) of the depth of the measurement object 105 when the relative phase ϕ is calculated with respect to the measurement object 105 in the case in which the reference image is obtained.

According to the first embodiment described above, the relative phase calculation section 316 obtains the grayscale image of the measurement object 105 on which the light is projected due to the first pattern projection and the grayscale image of the measurement object 105 on which the light is projected due to the second pattern projection from the imaging section 2. Then, the relative phase calculation section 316 calculates the relative phase ϕ using the grayscale images thus obtained. Thus, it is possible to calculate the reference ratio R as a variable small in variation with time in advance using the grayscale images of the measurement object 105 on which the first pattern 391a through the fourth pattern 391d are projected in every second time period (the pattern projection period). After the reference ratio R is calculated, it is possible for the relative phase calculation section 316 to calculate the relative phase ϕ using the two grayscale images of the first pattern 391a and the second pattern 391b, and the reference ratio R calculated in advance. Thus, it is possible to reduce the calculation time of the relative phase ϕ.

Specifically, as shown in FIG. 5, the relative phase calculation section 316 calculates the reference ratio R smaller in variation with time than other variables (e.g., the relative phase ϕ) in advance due to projections A through D of the light of the first pattern 391a through the fourth pattern 391d on the measurement object 105 each performed once in the pattern projection period. Then, in the pattern projection period, after the reference ratio R is calculated, the relative phase ϕ is calculated every time the first pattern 391a and the second pattern 391b are alternately projected. Thus, since calculation of the relative phase ϕ can be performed using the reference ratio R calculated in advance in common in the pattern projection period, the calculation time of the relative phase ϕ can be shortened.

Further, the technology disclosed in the first embodiment described above can be applied to the depth analysis described below by the depth shift calculation section 318 calculating the shift amount of the depth. For example, it is possible for the arithmetic device 100 to perform a vibration analysis of the measurement object 105, and a contact analysis on whether or not an object has had contact with the measurement object 105. As the vibration analysis, there can be cited, for example, an operation of calculating a shift amount of the depth in the case in which the measurement object 105 is shifted from a reference position due to a vibration to thereby analyze the state of the vibration. Further, as the contact analysis, there can be cited, for example, an operation of analyzing whether or not an object such as a finger or a touch pen has had contact with a screen as the measurement object 105 based on the shift amount of the depth of the measurement object 105. In particular, in the present embodiment, since the calculation time of the relative phase ϕ can be shortened, the calculation of the shift amount of the depth can also be shortened.

B. Second Embodiment

Figure 7:
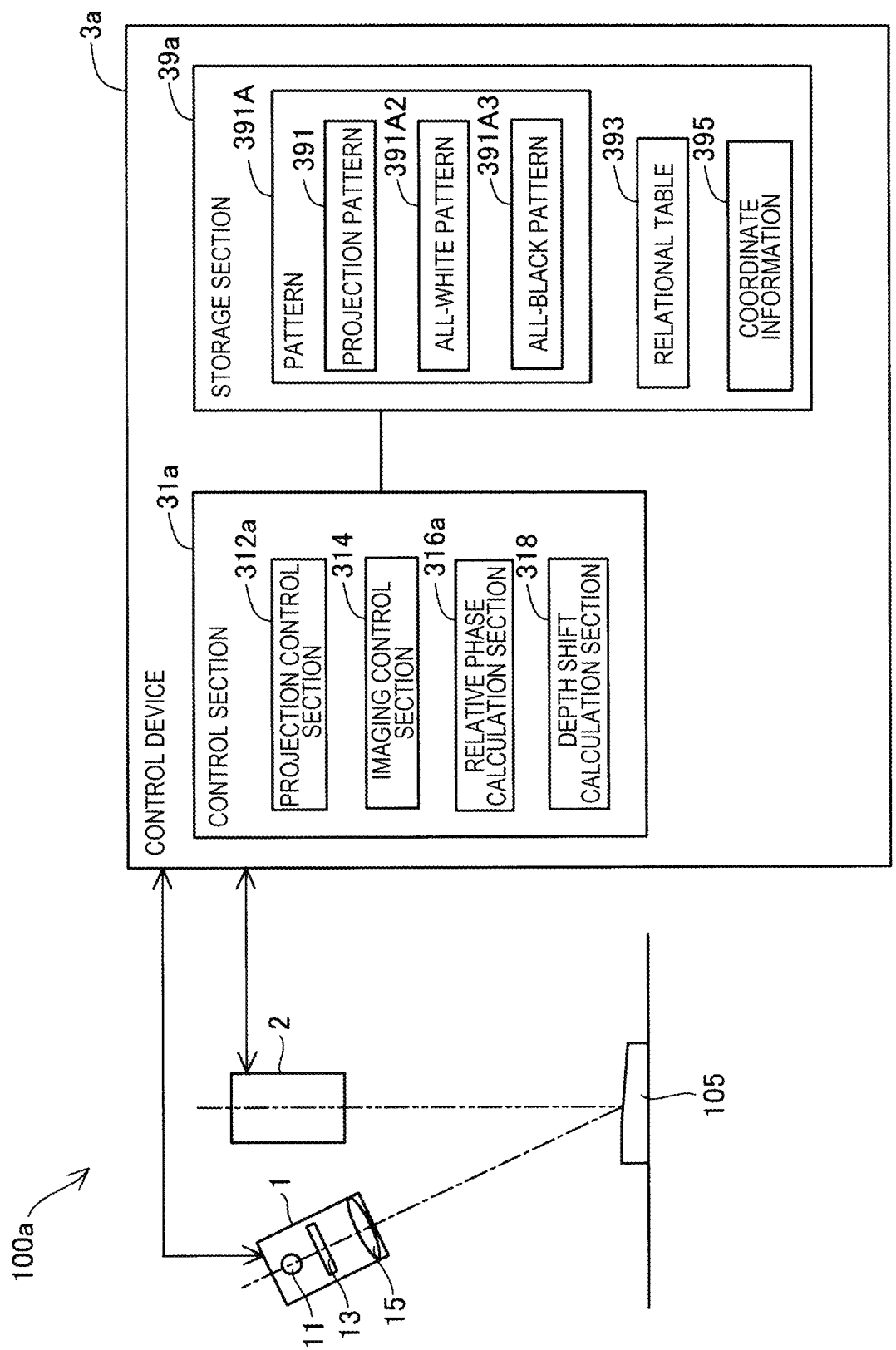
FIG. 7 is a diagram for explaining an arithmetic device as a second embodiment of the invention.

FIG. 7 is a diagram for explaining an arithmetic device 100a as a second embodiment of the invention. The points in which the arithmetic device 100a is different from the arithmetic device 100 (FIG. 1) according to the first embodiment described above are a pattern 391A stored in a storage section 39a, a control content of a projection control section 312a, and a calculation content of a relative phase calculation section 316a. The rest of the constituents are substantially the same constituents as those of the first embodiment, and therefore, substantially the same constituents as those of the first embodiment are denoted by substantially the same reference symbols as in the first embodiment, and the description thereof will be omitted.

The storage section 39a of a control device 3a stores the pattern 391A which is determined in advance, and is projected by the projection section 1. The pattern 391A has the projection pattern 391, an all-white pattern 391A2 in which the projection image is an all-white image, and an all-black pattern 391A3 in which the projection image is an all-black image. The projection pattern 391 is the same as the projection pattern 391 in the first embodiment, and is the projection pattern (FIG. 2) having the sinusoidal luminance variation.

The projection control section 312a of a control section 31a causes the projection section 1 to project the light of the projection pattern 391, light of the all-white pattern 391A2 and light of the all-black pattern 391A3. The projection control section 312a performs sinusoidal pattern projection and all-white/black pattern projection to thereby cause the projection section 1 to project the light of the pattern 391A on the measurement object 105 for the calculation of the relative phase ϕ.

The sinusoidal pattern projection has the same projection content as that of the first pattern projection in the first embodiment described above. Specifically, in the sinusoidal pattern projection, the projection section 1 is made to project the first pattern 391a and the second pattern 391b as the projection pattern 391 having the phases in the spatial frequency shifted by π from each other alternately in the first time period. The all-white/black pattern projection has the projection performed instead of the second pattern projection in the first embodiment described above. The details of the all-white/black pattern projection will hereinafter be described.

Figure 8:
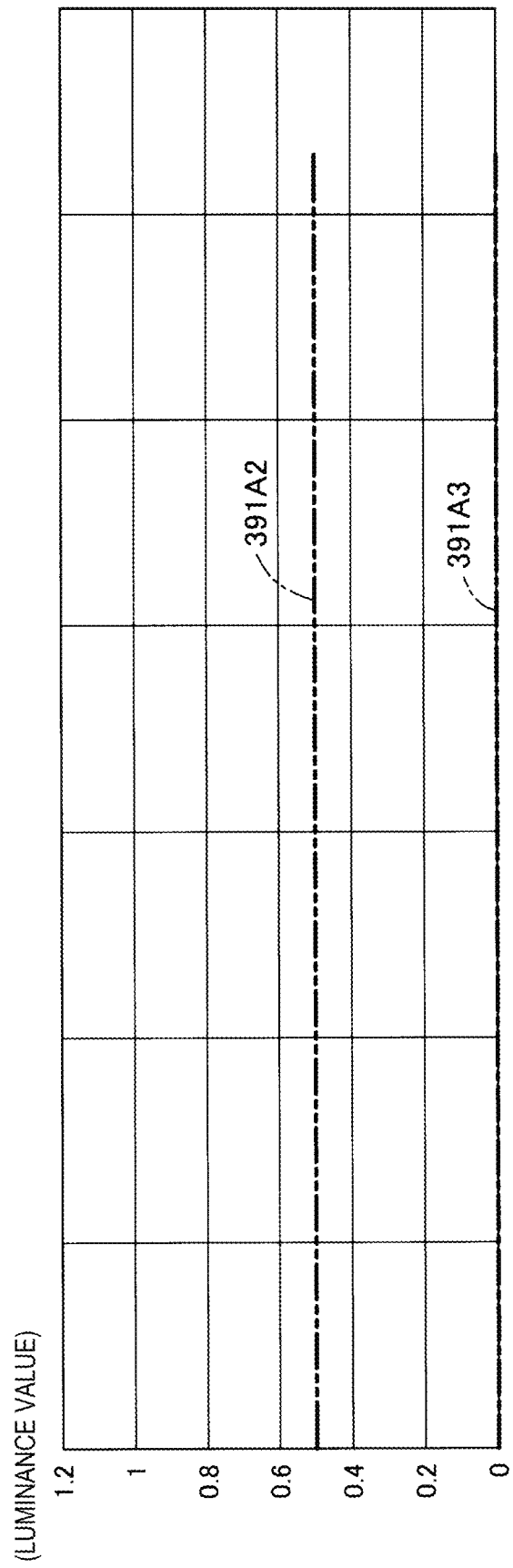
FIG. 8 is a diagram showing an all-white pattern and an all-black pattern.

FIG. 8 is a diagram showing the all-white pattern 391A2 and the all-black pattern 391A3 to be projected on the measurement object 105 due to the all-white/black pattern projection. The luminance value of the all-white pattern 391A2 is a half of the highest luminance value of the projection pattern 391a. In other words, the luminance value of the all-white pattern 391A2 is set so as to correspond to the amplitude of the first pattern 391a (FIG. 3). By adopting this configuration, since the calculation of the amplitude A using the all-white pattern 391A2 and the all-black pattern 391A3 can easily be performed, it is possible to easily calculate the relative phase ϕ. It should be noted that in other embodiments, the luminance value of the all-white pattern 391A2 is not limited to that in the second embodiment providing how many times the luminance value of the all-white pattern 391A2 is as large as the highest luminance value (the maximum luminance value) of the first pattern 391a is controlled by the projection control section 312a.

Figure 9:
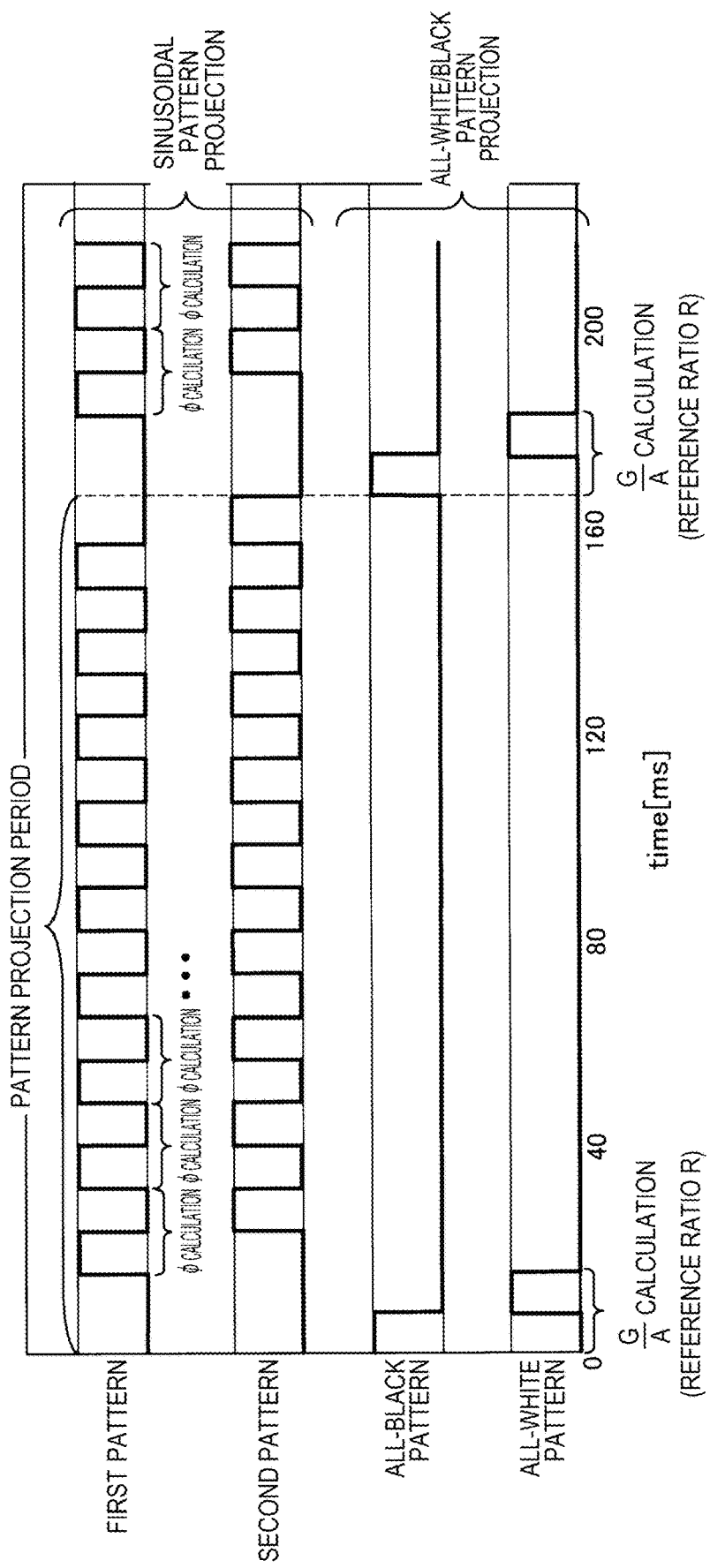
FIG. 9 is a projection timing chart due to sinusoidal pattern projection and all-white/black pattern projection.

FIG. 9 is a projection timing chart due to the sinusoidal pattern projection and the all-white/black pattern projection. In the projection timing chart shown in FIG. 9, the projection of the third pattern 391c of the projection timing chart (FIG. 5) of the first embodiment is replaced with the projection of the all-black pattern 391A3, and further, the projection of the fourth pattern 391d is replaced with the projection of the all-white pattern 391A2. In other words, in the all-white/black pattern projection, the projection section 1 is made to project the all-white pattern 391A2 and the all-black pattern 391A3 alternately with a longer time period than the sinusoidal pattern projection. Further, the projection control section 312a performs the sinusoidal pattern projection between the projection of the all-white pattern 391A2 and the all-black pattern 391A3 in a certain period and the projection of the all-white pattern 391A2 and the all-black pattern A3 in the subsequent period.

Figure 10:
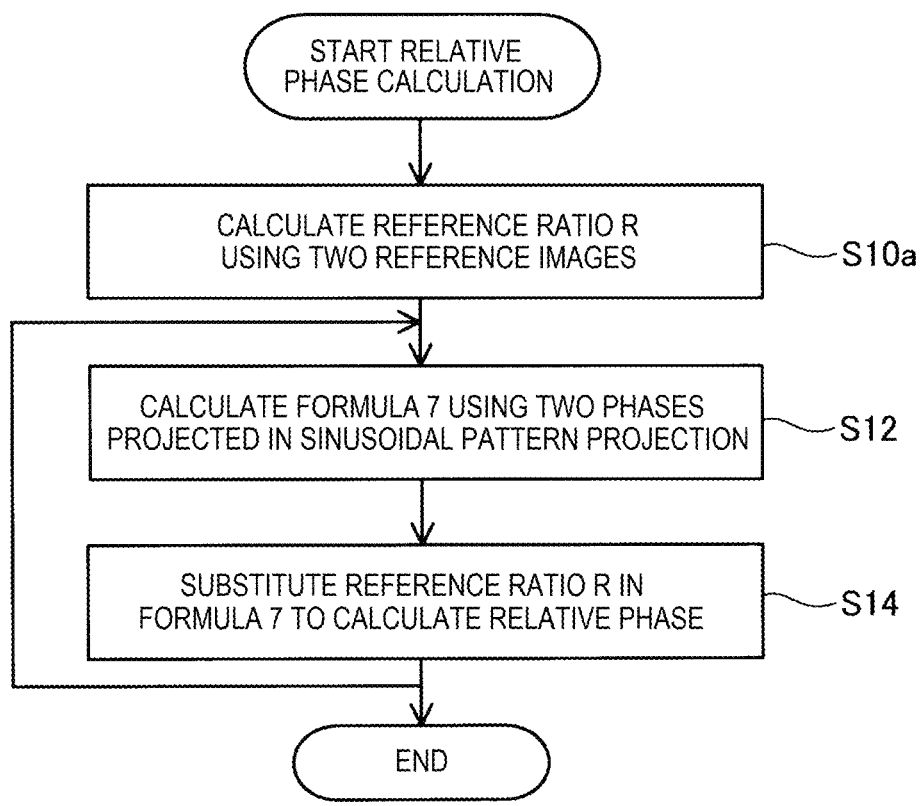
FIG. 10 is a flowchart showing a calculation process of a relative phase.

FIG. 10 is a flowchart showing a calculation process of the relative phase ϕ executed by the relative phase calculation section 316a. This flowchart is executed repeatedly in each pattern projection period by the arithmetic device 100a receiving the input from the outside. The pattern projection period denotes the time period from the beginning of a certain period to the beginning of the subsequent period in the all-white/black pattern projection.

When the calculation process of the relative phase ϕ is started, the relative phase calculation section 316a calculates (step S10a) the reference ratio R (=G/A) using two reference images of the measurement object 105. One of the two reference images is an image (a white reference image) obtained by the imaging section 2 imaging the measurement object 105 on which the light of the all-white pattern 391A2 is projected in the all-white/black pattern projection. Further, the other of the two reference images is an image (a black reference image) obtained by the imaging section 2 imaging the measurement object 105 on which the light of the all-black pattern 391A3 is projected in all-white/black pattern projection. The relative phase calculation section 316a uses the luminance value of each pixel of the black reference image as the background luminance G in that pixel. Further, the relative phase calculation section 316a calculates the amplitude A by subtracting the luminance value of the black reference image from the luminance value of the white reference image in each of the pixels. It should be noted that in the case in which the luminance value of the all-white pattern 391A2 does not correspond to the amplitude of the first pattern 391a, the amplitude A is calculated by subtracting the luminance value of the black reference image from the luminance value of the white reference image, and then multiplying the result by a correction value. The correction value is calculated in advance based on the luminance value of the all-white pattern 391A2 and the amplitude of the first pattern 391a. In the case in which, for example, the luminance value of the all-white pattern 391A2 is N times as large as the maximum luminance value of the first pattern 391a, the correction value becomes 1/(2N).

Then, the relative phase calculation section 316a executes the processes of the step S12 and the step S14 similar to those of the first embodiment. It should be noted that the "sinusoidal pattern projection" in the step S12 of the second embodiment and the "first pattern projection" in the step S12 of the first embodiment are the same in projection content as each other. As shown in FIG. 9, the reference ratio R is firstly calculated for each pattern projection period, and then the reference ratio R is used as a common value for calculating the relative phase $\phi$. Further, the depth shift calculation section 318 in the second embodiment calculates the shift amount (the relative three-dimensional shape) of the depth of the measurement object 105 every time the relative phase $\phi$ is calculated similarly to the first embodiment.

As described above, according to the arithmetic device 100a related to the second embodiment, the relative phase calculation section 316a obtains the grayscale image of the measurement object 105 on which the light is projected due to the sinusoidal pattern projection and the reference image of the measurement object 105 on which the light is projected due to the all-white/black pattern projection from the imaging section 2. Then, the relative phase calculation section 316a calculates the relative phase $\phi$ of the projection pattern 391 at an arbitrary position in the grayscale image of the measurement object 105 on which the light of the projection pattern 391 is projected using the grayscale image and the reference image thus obtained. Thus, it is possible to calculate the reference ratio R in advance in each pattern projection period (the projection period of the all-white/black pattern projection) using the two reference images, namely the reference image in which the light of the all-black pattern 391A3 is projected and the reference image in which the light of the all-white pattern 391A2 is projected. Thus, in the pattern projection period, after the reference ratio R is calculated, it is possible to calculate the relative phase $\phi$ using the two grayscale images of the first pattern 391a and the second pattern 391b, and the reference ratio R calculated in advance. Thus, it is possible to reduce the calculation time of the relative phase $\phi$. Further, according to the second embodiment described above, similarly to the first embodiment described above, since the calculation time of the relative phase $\phi$ can be shortened, the calculation of the shift amount of the depth can also be shortened.

C. Third Embodiment

Figure 11:
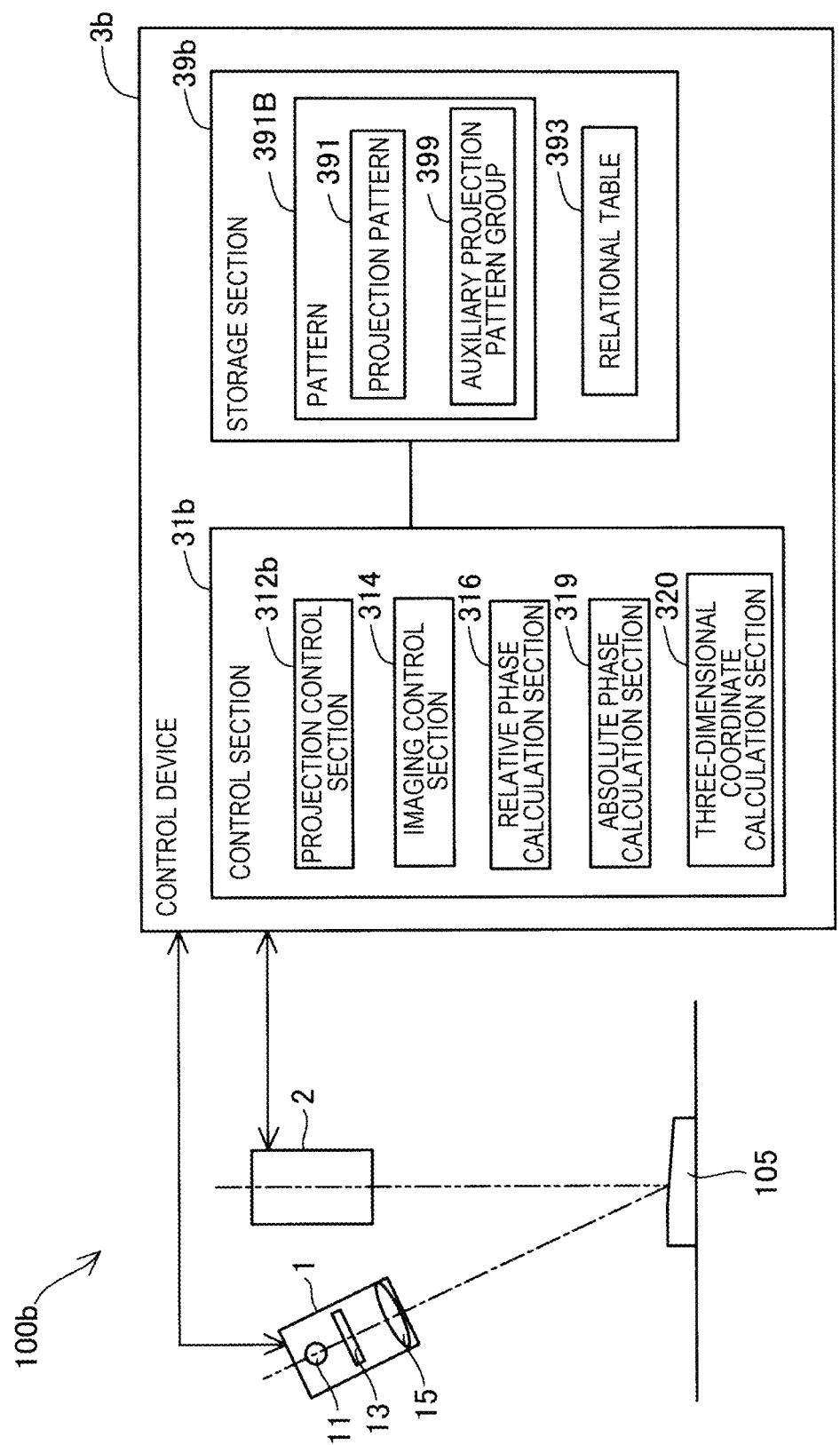
FIG. 11 is a diagram for explaining an arithmetic device as a third embodiment of the invention.

FIG. 11 is a diagram for explaining an arithmetic device 100b as a third embodiment of the invention. The points in which the arithmetic device 100b is different from the arithmetic device 100 (FIG. 1) according to the first embodiment described above are a processing content executed by a control section 31b of a control device 3b, and a content stored in a storage section 39b. In the third embodiment, substantially the same constituents as those in the first embodiment are denoted by substantially the same reference symbols as those in the first embodiment, and the explanation thereof will be omitted.

The control section 31b additionally has an absolute phase calculation section 319 and a three-dimensional coordinate calculation section 320. The absolute phase calculation section 319 performs phase unwrapping on the relative phase $\phi$ at an arbitrary position to calculate an absolute phase $\phi$a of the projection pattern 391. Specifically, the absolute phase calculation section 319 calculates a fringe order n, and then calculates the absolute phase $\phi$a using the relative phase $\phi$ and the fringe order n thus calculated. The three-dimensional coordinate calculation section 320 calculates the three-dimensional coordinate in the absolute coordinate system, namely the absolute depth, of the measurement object 105 from the absolute phase $\phi$a thus calculated using the principle of triangulation. By calculating the three-dimensional coordinate in the absolute coordinate system of the measurement object 105, it is possible to obtain the three-dimensional shape of the measurement object 105. The measurement principle of triangulation has been well known to the public, and therefore, the detailed description thereof will be omitted.

The storage section 39b stores a pattern 391B which is determined in advance, and is projected by the projection section 1. The pattern 391B has the projection pattern 391 and an auxiliary projection pattern group 399. The projection pattern 391 is the same as the projection pattern 39 in the first embodiment, and is the projection pattern (FIG. 2) having the sinusoidal luminance variation. The auxiliary projection pattern group 399 has a plurality of auxiliary projection pattern lower in spatial frequency than the projection pattern 391. The plurality of auxiliary projection patterns are each a pattern as the stripe pattern having the sinusoidal luminance variation. The spatial frequency of each of the auxiliary projection patterns included in the auxiliary projection pattern group 399 is preferably 1/N times (N is a natural number no smaller than 2) as large as the spatial frequency of the projection pattern 391. By adopting this configuration, it is possible for the absolute phase calculation section 319 to easily calculate the fringe order. The plurality of auxiliary projection patterns are different in spatial frequency from each other. In the present embodiment, the auxiliary projection pattern group 399 includes an A-th auxiliary projection pattern 399A, a B-th auxiliary projection pattern 399B and a C-th auxiliary projection pattern 399C. The A-th auxiliary projection pattern 399A has a spatial frequency a half as high as that of the projection pattern 391. The B-th auxiliary projection pattern 399B has a spatial frequency a fourth as high as that of the projection pattern 391. The C-th auxiliary projection pattern 399C has a spatial frequency an eighth as high as that of the projection pattern 391.

A projection control section 312b performs first auxiliary pattern projection and second auxiliary pattern projection using the auxiliary projection pattern group 399 in addition to execution of the first pattern projection and the second pattern projection using the projection pattern 391. It should be noted that the imaging section 2 takes the image of the measurement object 105 every time each of the patterns in the first pattern projection, each of the patterns in the second pattern projection, each of the patterns in the first auxiliary pattern projection, or each of the patterns in the second auxiliary pattern projection is projected on the measurement object 105. Thus, the grayscale images of the measurement object 105 on which the respective patterns are projected are obtained.

Figure 12:
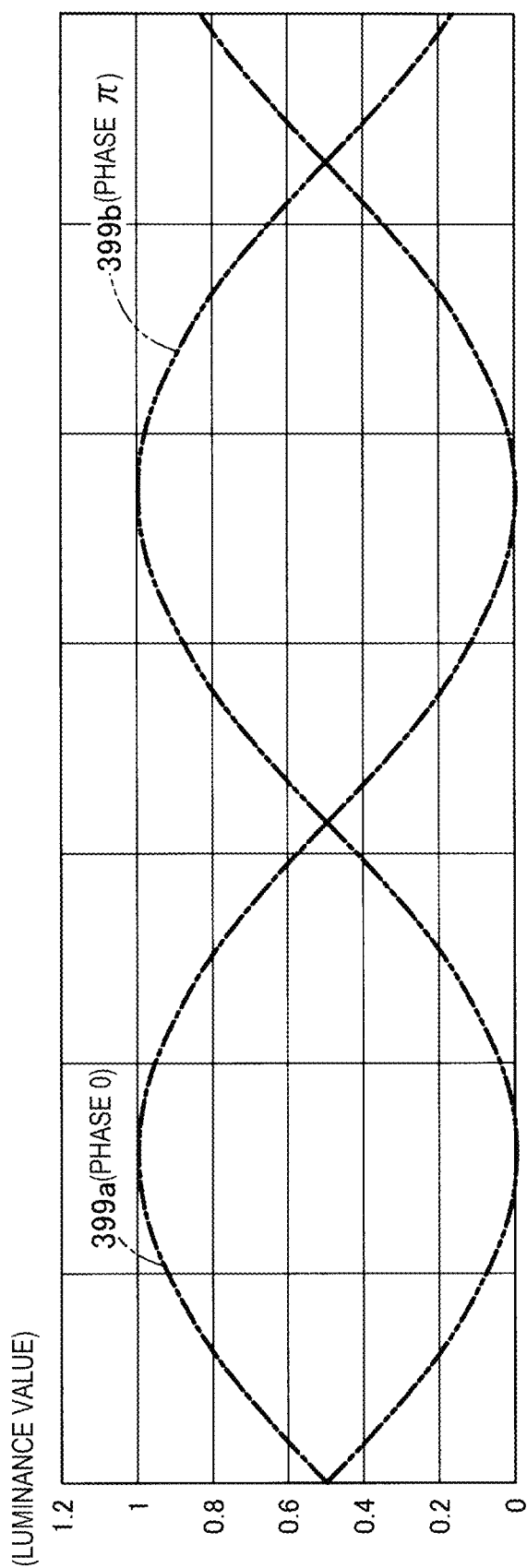
FIG. 12 is a diagram showing a projection pattern to be projected due to first auxiliary pattern projection.

FIG. 12 is a diagram showing the A-th auxiliary projection pattern 399A to be projected on the measurement object 105 due to the first auxiliary pattern projection. In the first auxiliary pattern projection, a fifth pattern 399a1 and a sixth pattern 399b1 as the A-th auxiliary projection pattern 399A having phases in the spatial frequency shifted by π from each other are projected in a time-series manner.

Figure 13:
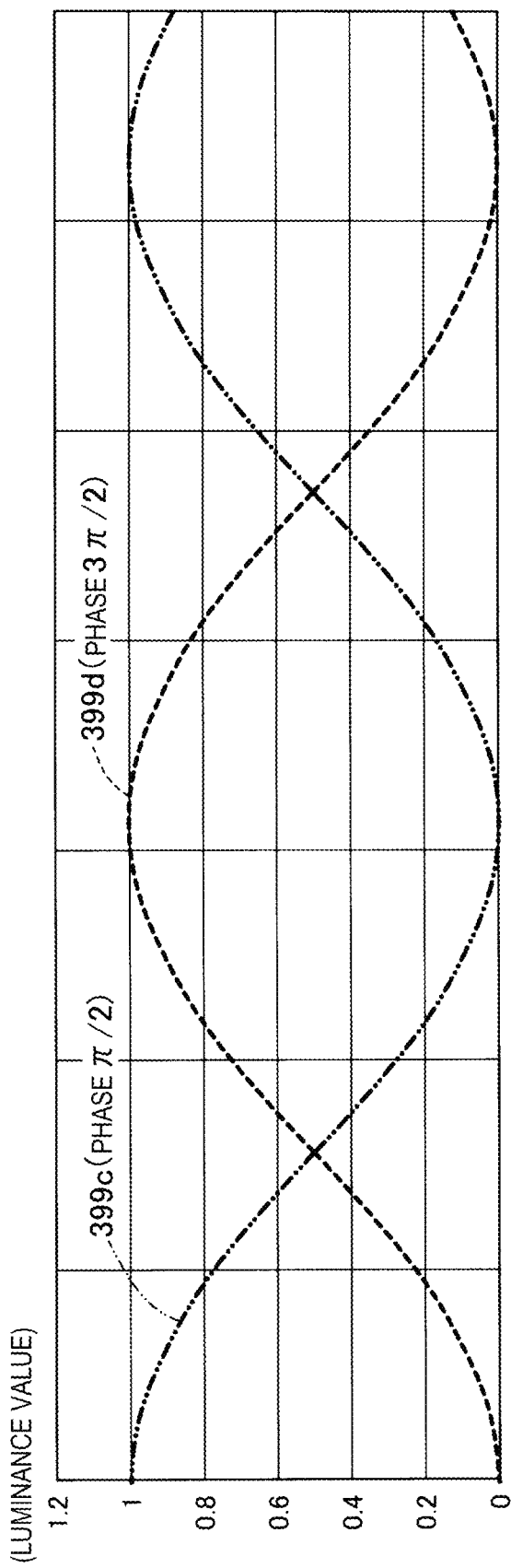
FIG. 13 is a diagram showing a projection pattern to be projected due to second auxiliary pattern projection.

FIG. 13 is a diagram showing the A-th auxiliary projection pattern 399A to be projected on the measurement object 105 due to the second auxiliary pattern projection. In the second auxiliary pattern projection, a seventh pattern 399c1 and an eighth pattern 399d1 as the A-th auxiliary projection pattern 399A having phases in the spatial frequency shifted by π from each other are projected in a time-series manner. Further, the seventh pattern 399c1 and the eighth pattern 399d1 are shifted in phase by π/2 from the fifth pattern 399a1 and the sixth pattern 399b1, respectively.

FIG. 12 and FIG. 13 are explained using the A-th auxiliary projection pattern 399A of the auxiliary projection pattern group 399 as an example, and each of the B-th auxiliary projection pattern 399B and the C-th auxiliary projection pattern 399C is similarly projected on the measurement object 105 due to the first auxiliary pattern projection and the second auxiliary pattern projection. In other words, the first auxiliary pattern projection in which a fifth pattern 399a and a sixth pattern 399b having the phases in the spatial frequency shifted by π from each other are projected is also performed on each of the B-th auxiliary projection pattern 399B and the C-th auxiliary projection pattern 399C. Further, the second auxiliary pattern projection in which a seventh pattern 399c and an eighth pattern 399d having the phases in the spatial frequency shifted by π from each other are projected is also performed on each of the B-th auxiliary projection pattern 399B and the C-th auxiliary projection pattern 399C. Further, in the case of using the fifth pattern 399a through the eighth pattern 399d of each of the auxiliary projection patterns 399A through 399C so as to be distinguished from each other, the following is used. That is, "1" is attached to the tail end of the reference symbol of each of the fifth pattern 399a through the eighth pattern 399d of the A-th auxiliary projection pattern 399A, "2" is attached to the tail end of the reference symbol of each of the fifth pattern 399a through the eighth pattern 399d of the B-th auxiliary projection pattern 399B, and "3" is attached to the tail end of the reference symbol of each of the fifth pattern 399a through the eighth pattern 399d of the C-th auxiliary projection pattern 399C.

Further, in the present embodiment, the three fifth patterns 399a of the A-th auxiliary projection pattern 399A through the C-th auxiliary projection pattern 399C are collectively referred to also as a fifth pattern group 399Ga, and the three sixth patterns 399b are collectively referred to also as a sixth pattern group 399Gb. Further, the three seventh patterns 399c of the A-th auxiliary projection pattern 399A through the C-th auxiliary projection pattern 399C are collectively referred to also as a seventh pattern group 399Gc, and the three eighth patterns 399d are collectively referred to also as an eighth pattern group 399Gd.

Figure 14:
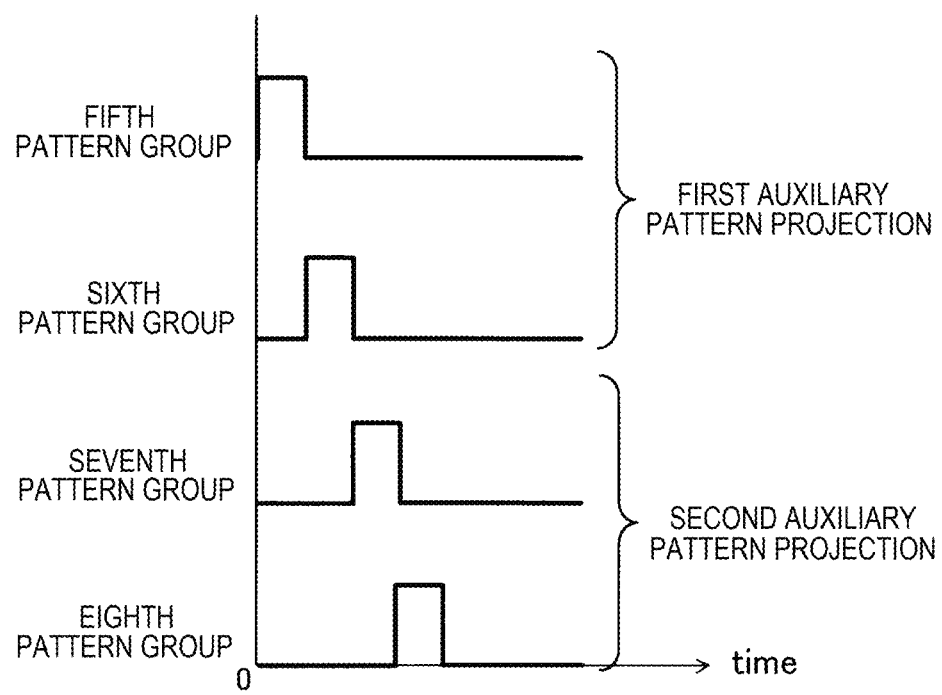
FIG. 14 is a projection timing chart due to the first auxiliary pattern projection and the second auxiliary pattern projection.

FIG. 14 is a projection timing chart of the fifth pattern group Ga through the eighth pattern group 399Gd due to the first auxiliary pattern projection and the second auxiliary pattern projection. In the first auxiliary pattern projection, the light of the fifth pattern group 399Ga and the light of the sixth pattern group Gb are projected on the measurement object 105. Further, in the second auxiliary pattern projection, the light of the seventh pattern group 399Gc and the light of the eighth pattern group Gd are projected on the measurement object 105. In the example shown in FIG. 14, the fifth pattern group 399Ga through the eighth pattern group 399Gd are projected in sequence. Further, in the example shown in FIG. 14, the projection time of each of the patterns of the fifth pattern group 399Ga through the eighth pattern group 399Gd is 1/120 second. In other words, the projection control section 312b causes the projection section 1 to project the fifth pattern group and the sixth pattern group in which the fifth pattern and the sixth pattern are set for each of spatial frequencies lower than the spatial frequency of the projection pattern 391. Further, the projection control section 312b causes the projection section 1 to project the seventh pattern group and the eighth pattern group shifted in phase by π/2 from the fifth pattern group and the sixth pattern group, and shifted in phase by π from each other.

For example, the fifth pattern 339a1 through the eighth pattern 399d1 of the A-th auxiliary projection pattern 399A are projected at the projection timing shown in FIG. 14, then the fifth pattern 339a2 through the eighth pattern 399d2 of the B-th auxiliary projection pattern 399B are projected at the projection timing shown in FIG. 14, and finally, the fifth pattern 339a3 through the eighth pattern 399d3 of the C-th auxiliary projection pattern 399C are projected at the projection timing shown in FIG. 14.

The projection control section 312b performs the projection of the fifth pattern 399a through the eighth pattern 399d using substantially the same timing chart shown in FIG. 5 described in the first embodiment with respect also to each of the A-th auxiliary projection pattern 399A through the C-th auxiliary projection pattern 399C in order to calculate the relative phase φ using the relative phase calculation section 316. In other words, in the single pattern projection period, after the first projection of the first pattern 391a through the fourth pattern 391d shown in FIG. 5 has been completed, the projection (the first auxiliary pattern projection and the second auxiliary pattern projection shown in FIG. 14) of the fifth pattern group 399Ga through the eighth pattern group 399Gd is performed. Thus, the relative phase calculation section 316 calculates the reference ratio R of each of the A-th auxiliary projection pattern 399A through the C-th auxiliary projection pattern 399C in addition to the reference ratio R of the projection pattern 391. Here, for the sake of easiness of understanding, the reference ratio R of the projection pattern 391 is also referred to as a basic reference ratio R, the reference ratio R of the A-th auxiliary projection pattern 399A is also referred to as a first auxiliary reference ratio R1, the reference ratio R of the B-th auxiliary projection pattern 399B is also referred to as a second auxiliary reference ratio R2, and the reference ratio R of the C-th auxiliary projection pattern 399C is also referred to as a third auxiliary reference ratio R3.

The projection control section 312b performs the projection of the pattern for calculating the basic reference ratio R, and the first auxiliary reference ratio R1 through the third auxiliary reference ratio R3, and then performs the following projection. That is, the projection control section 312b performs the first pattern projection shown in FIG. 5 in order to calculate the relative phase φ of the projection pattern 391, and performs the projection (the first auxiliary pattern projection) of the fifth patterns 399a1, 399a2 and 399a3 and the sixth patterns 399b1, 399b2 and 399b3 in order to calculate the relative phase φ of each of the A-th auxiliary projection pattern 399A through the C-th auxiliary projection pattern 399C. For example, the projection control section 312b performs the projection (the first auxiliary pattern projection) of a set of the fifth pattern 399a and the sixth pattern 399b in each of the A-th auxiliary projection pattern 399A through the C-th auxiliary projection pattern 399C every time the projection (the first pattern projection) of a set of the first pattern 391a and the second pattern 391b is performed.

Thus, the relative phase calculation section 316 calculates the relative phase ϕ of each of the projection patterns 391, 399a, 399b and 399c using the basic reference ratio R and the first auxiliary reference ratio R1 through the third auxiliary reference ratio R3 thus calculated, and the image of the measurement object 105 on which the light due to the first pattern projection and the first auxiliary pattern projection is projected. Here, the relative phase ϕ of the projection pattern 391 is also referred to as a "relative phase ϕ1," the relative phase ϕ of the A-th auxiliary projection pattern 399A is also referred to as a "relative phase ϕ2," the relative phase ϕ of the B-th auxiliary projection pattern 399B is also referred to as a "relative phase ϕ3," and the relative phase ϕ of the C-th auxiliary projection pattern 399C is also referred to as a "relative phase ϕ4."

The absolute phase calculation section 319 (FIG. 11) calculates the absolute phase ϕa using the four grayscale images of the measurement object 105 on which the light due to the first pattern projection and the second pattern projection is projected, and the four auxiliary grayscale images of the measurement object 105 on which the light due to the first auxiliary pattern projection and the second auxiliary pattern projection is projected in each of the A-th auxiliary projection pattern 399A through the C-th auxiliary projection pattern 399C. In other words, the absolute phase calculation section 319 calculates the fringe order n using the four grayscale images and the four auxiliary grayscale images in each of the A-th auxiliary projection pattern 399A through the C-th auxiliary projection pattern 399C, and then calculates the absolute phase ϕa using the relative phases ϕ and the fringe order n thus calculated. Specifically, the absolute phase calculation section 319 calculates the fringe order n and the absolute phase ϕa using the relative phases ϕ1, ϕ2, ϕ3 and ϕ4 thus calculated. Regarding the calculation method of the fringe order n and the absolute phase ϕa, since the fringe order n and the absolute phase ϕa can be calculated using a known method, and therefore, the details of the calculation method will be omitted.

The three-dimensional coordinate calculation section 320 calculates the three-dimensional coordinate in the absolute coordinate system of the measurement object 105 from the absolute phase ϕa thus calculated using the principle of triangulation.

According to the third embodiment described above, substantially the same advantages as those of the first embodiment are exerted in the point that the third embodiment has substantially the same configuration as that of the first embodiment described above. In addition, according to the third embodiment described above, the absolute phase ϕa can be calculated by the absolute phase calculation section 319, and at the same time, the three-dimensional coordinate in the absolute coordinate system of the measurement object 105 can be calculated by the three-dimensional coordinate calculation section 320.

D. Fourth Embodiment

Figure 15:
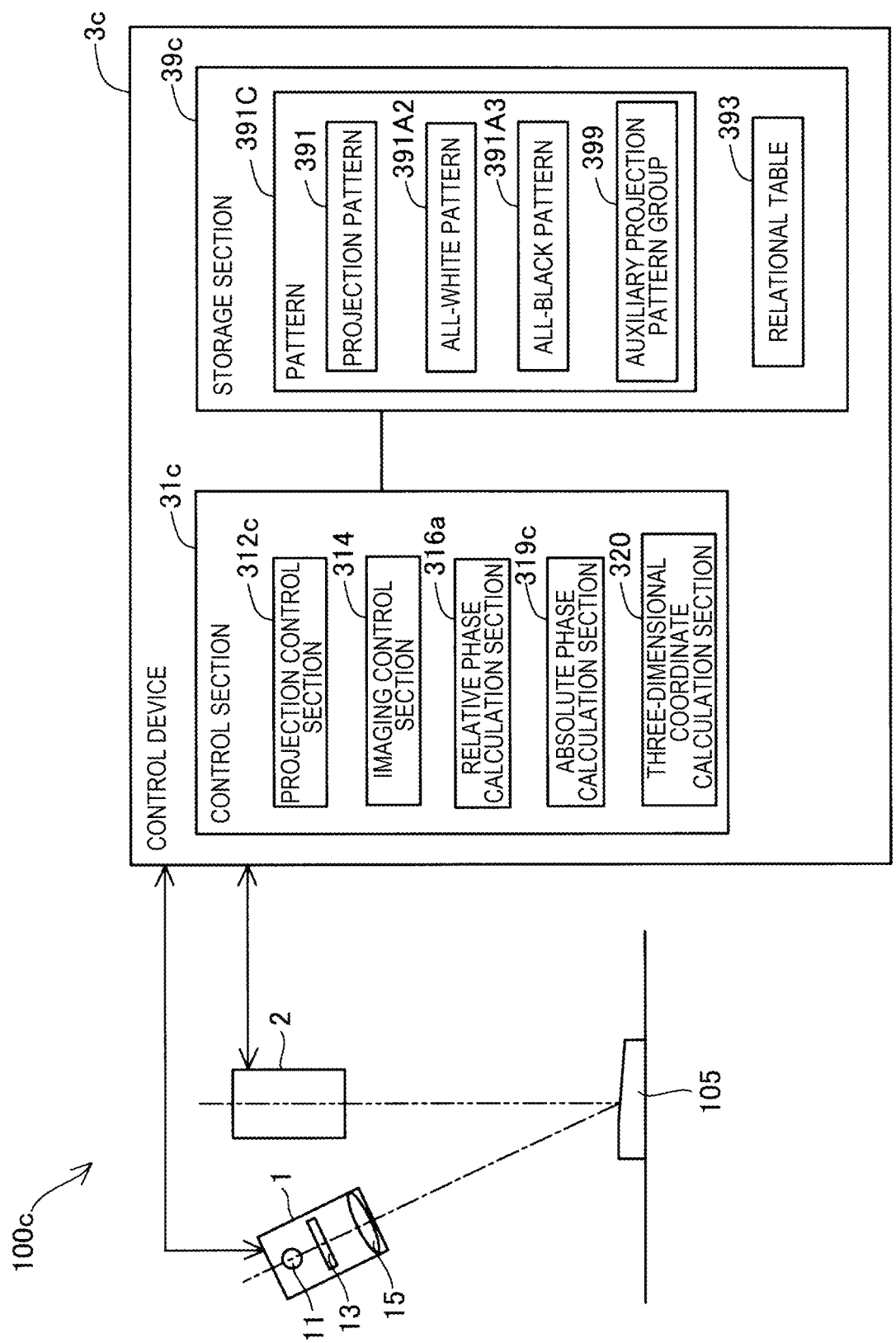
FIG. 15 is a diagram for explaining an arithmetic device as a fourth embodiment of the invention.

FIG. 15 is a diagram for explaining an arithmetic device 100c as a fourth embodiment of the invention. The points in which the arithmetic device 100c is different from the arithmetic device 100a (FIG. 7) according to the second embodiment described above are a processing content executed by a control section 31c of a control device 3c, and a content stored in a storage section 39c. In the fourth embodiment, substantially the same constituents as those in the second embodiment are denoted by substantially the same reference symbols as those in the second embodiment, and the explanation thereof will be omitted.

Similarly to the control section 31b according to the third embodiment, the control section 31c additionally has the absolute phase calculation section 319 and the three-dimensional coordinate calculation section 320. The absolute phase calculation section 319 is substantially the same as in the third embodiment, and performs phase unwrapping on the relative phase ϕ at an arbitrary position to calculate the absolute phase ϕa of the projection pattern 391. The three-dimensional coordinate calculation section 320 is substantially the same as in the third embodiment, and calculates the three-dimensional coordinate in the absolute coordinate system of the measurement object 105 from the absolute phase ϕa thus calculated using the principle of triangulation.

The storage section 39c stores a pattern 391C which is determined in advance, and is projected by the projection section 1. The pattern 391C includes the projection pattern 391, the all-white pattern 391A2, the all-black pattern 391A3, and the auxiliary projection pattern group 399. Similarly to the third embodiment described above, the auxiliary projection pattern group 399 includes the A-th auxiliary projection pattern 399A, the B-th auxiliary projection pattern 399B and the C-th auxiliary projection pattern 399C.

A projection control section 312c newly performs auxiliary pattern projection using the auxiliary projection pattern group 399 in addition to (FIG. 9) the execution of the sinusoidal pattern projection and the all-white/black pattern projection similar to those of the second embodiment.

The auxiliary pattern projection performed by the projection control section 312c is substantially the same as the first auxiliary pattern projection in the third embodiment, and the fifth patterns 399a1, 399a2 and 399a3 and the sixth patterns 399b1, 399b2 and 399b3 are projected in a time-series manner for each of the A-th auxiliary projection pattern 399A, the B-th auxiliary projection pattern 399B and the C-th auxiliary projection pattern 399C. In other words, the projection control section 312c projects the fifth patterns 399a1, 399a2 and 399a3 and the sixth patterns 399b1, 399b2 and 399b3 with substantially the same timing chart as that of the sinusoidal projection pattern shown in FIG. 9 in order to calculate the relative phase ϕ using the relative phase calculation section 316a also for each of the A-th auxiliary projection pattern 399A through the C-th auxiliary projection pattern 399C. Specifically, in the single pattern projection period, the projection control section 312c sequentially performs the following projection every time the projection control section 312c performs the projection (the sinusoidal pattern projection) of a set of the first pattern 391a and the second pattern 391b. Specifically, the projection control section 312c sequentially performs the projection of the fifth pattern 399a1 and the sixth pattern 399b1 in the A-th auxiliary projection pattern 399A, the projection of the fifth pattern 399a2 and the sixth pattern 399b2 in the B-th auxiliary projection pattern 399B, and the projection of the fifth pattern 399a3 and the sixth pattern 399b3 in the C-th auxiliary projection pattern 399C.

The relative phase calculation section 316a calculates the relative phases ϕ1, ϕ2, ϕ3 and ϕ4 of the respective patterns 391, 399A, 399B and 399C using the reference ratio R calculated for each pattern projection period, and the grayscale images of the measurement object 105 on which the light due to the sinusoidal pattern projection and the first auxiliary pattern projection is projected.

An absolute phase calculation section 319c calculates the absolute phase ϕa using the two grayscale images of the measurement object 105 on which the light due to the sinusoidal pattern projection is projected, the two reference images of the measurement object 105 on which the light due to the all-white/black pattern projection is projected, and the two auxiliary grayscale images of the measurement object 105 on which the light due to the auxiliary pattern projection is projected. In other words, the absolute phase calculation section 319*c* calculates the fringe order n using the two grayscale images and the two auxiliary grayscale images in each of the A-th auxiliary projection pattern 399A through the C-th auxiliary projection pattern 399C, and then calculates the absolute phase φa using the relative phases φ and the fringe order n thus calculated. Specifically, the absolute phase calculation section 319*c* calculates the fringe order n and the absolute phase φa using the relative phases φ1, φ2, φ3 and φ4 thus calculated. The three-dimensional coordinate calculation section 320 calculates the three-dimensional coordinate in the absolute coordinate system of the measurement object 105 from the absolute phase φa thus calculated using the principle of triangulation.

According to the fourth embodiment described above, substantially the same advantages as those of the second embodiment are exerted in the point that the fourth embodiment has substantially the same configuration as that of the second embodiment described above. In addition, according to the fourth embodiment described above, the absolute phase φa can be calculated by the absolute phase calculation section 319*c*, and at the same time, the three-dimensional coordinate in the absolute coordinate system of the measurement object 105 can be calculated by the three-dimensional coordinate calculation section 320. Further, since it is possible to use the common reference ratio R for the calculation of the relative phases φ1, φ2, φ3 and φ4, the time for calculating the relative phases φ1, φ2, φ3 and φ4 can be shortened.

E. Other Embodiments

E-1. Other Embodiment 1

In the third embodiment and the fourth embodiment, the absolute phase calculation sections 319, 319*c* each calculate the absolute phase φa using the auxiliary grayscale images, the grayscale images and the reference images, but the calculation method of the absolute phase φa is not limited to the above. For example, it is also possible for the absolute phase calculation sections 319, 319*c* to calculate the absolute phase φa by calculating the fringe order n using a spatial code pattern and the projection pattern 391.

E-2. Other Embodiment 2

In the third and fourth embodiments described above, the three auxiliary projection patterns 399A through 399C included in the auxiliary projection pattern group 399 respectively have the spatial frequencies a half, a fourth and an eighth as high as the spatial frequency of the projection pattern 391, but this is not a limitation. For example, the three auxiliary projection patterns are not limited to the above as long as the auxiliary projection patterns are lower in spatial frequency than the projection pattern 391, and can also have spatial frequencies a sixteenth, a thirty-second and a sixty-fourth as high as the spatial frequency of the projection pattern 391. Further, the number of times of the projection of the auxiliary projection pattern is not limited to three, but can also be four, namely the auxiliary projection patterns respectively having the spatial frequencies a half, a fourth, an eighth and a sixteenth as high as that of the projection pattern 391, or more. Further, the projection timings of the projection patterns 391, 399A, 399B and 399C for calculating the relative phases φ1, φ2, φ3 and φ4 in the single pattern projection period in the third and fourth embodiments described above are not limited to those in the third and fourth embodiments described above. For example, in the third embodiment, it is also possible to sequentially project the three fifth patterns 399*a*1 through 399*a*3 after the projection of a set of the first pattern 391*a* and the second pattern 391*b*, then sequentially project the three sixth patterns 399*b*1 through 399*b*3, then sequentially project the three seventh patterns 399*c*1 through 399*c*3, and then sequentially project the three eighth patterns 399*d*1 through 399*d*3.

E-3. Other Embodiment 3

In the third embodiment, the first through third auxiliary reference ratios R1, R2 and R3 are calculated in order to calculate the relative phases φ2, φ3 and φ4, but this is nota limitation. For example, it is also possible to calculate the relative phases φ2, φ3 and φ4 assuming at least one of the basic reference ratio R, and the first through third auxiliary reference ratios R1, R2 and R3 as the rest of the reference ratios. By adopting this configuration, it is possible to shorten the pattern projection period.

E-4. Other Embodiment 4

In each of the embodiments described above, a liquid crystal projector is used as the projection section 1, but this is not a limitation. For example, the projection section 1 can also be an element capable of projecting a pattern on a space such as an MEMS scanner or a DLP. Further, in each of the embodiments described above, the wavelength of the pattern to be projected can also be of visible light or invisible light such as near infrared light. Further, in each of the embodiments described above, the light of the projection pattern having the sinusoidal luminance variation to be projected on the measurement object 105 can have a stripe pattern in a vertical direction (i.e., a stripe pattern having the luminance varying along a horizontal direction) or a stripe pattern in a horizontal direction (i.e., a stripe pattern having the luminance varying along a vertical direction), or can also have a pattern obtained by combining these stripe patterns with each other. In the case of projecting the light of the projection pattern provided only with the stripe pattern in the vertical direction on the measurement object 105, it is preferable for the projection section 1 and the imaging section 2 to be arranged side by side in the horizontal direction. Further, in the case of projecting the light of the projection pattern provided only with the stripe pattern in the horizontal direction on the measurement object 105, it is preferable for the projection section 1 and the imaging section 2 to be arranged side by side in the vertical direction. In other words, it is preferable for the projection pattern to be perpendicular to the epipolar line determined by the arrangement positions of the projection section 1 and the imaging section 2.

E-5. Other Embodiment 5

The arithmetic devices 100, 100*a*, 100*b* and 100*c* according to the respective embodiments described above can be installed in equipment for measuring the three-dimensional shape of the measurement object 105, can also be installed in equipment for performing a three-dimensional vibration analysis, or can also be installed in a touch recognizer for recognizing whether or not an object has contact with a certain target object.

F. Other Aspects

The invention is not limited to the embodiments described above, but can be implemented in a variety of aspects within the scope or the spirit of the invention. For example, the invention can also be implemented in the following aspects. The technical features in each of the embodiments described above corresponding to the technical features in each of the aspects described below can arbitrarily be replaced or combined in order to solve a part or the whole of the problem of the invention, or to achieve some or all of the advantages of the invention. Further, the technical feature can arbitrarily be eliminated unless described in the specification as an essential element.

(1) According to an aspect of the invention, there is provided a computer program adapted to control an arithmetic device provided with a projection section adapted to project light of a projection pattern having a sinusoidal luminance variation on a measurement object, and an imaging section adapted to take an image of the measurement object. The computer program causes a computer to realize a calculation function adapted to calculate a relative phase of the projection pattern at an arbitrary position in a grayscale image of the measurement object on which the light of the projection pattern is projected, the grayscale image being taken by the imaging section, and a projection execution function adapted to perform (i) first pattern projection adapted to cause the projection section to project a first pattern and a second pattern as the projection pattern having phases in a spatial frequency shifted by $\pi$ from each other alternately in a first time period, and (ii) second pattern projection adapted to cause the projection section to project a third pattern and a fourth pattern as the projection pattern having phases in the spatial frequency shifted by $\pi/2$ from the first pattern and the second pattern, the phases of the third pattern and the fourth pattern being shifted by $\pi$ from each other, alternately in a second time period longer than the first time period, wherein the projection execution function includes a function adapted to perform the first pattern projection between projection of the third pattern and the fourth pattern in a certain period and projection of the third pattern and the fourth pattern in a subsequent period, and the calculation function includes a function adapted to obtain a grayscale image of the measurement object on which the light is projected due to the first pattern projection and a grayscale image of the measurement object on which the light is projected due to the second pattern projection from the imaging section to calculate the relative phase using the grayscale images obtained. According to this aspect, by previously calculating a variable small in variation with time using the grayscale images in which the first pattern through the fourth pattern are projected every second time period, it is possible to thereafter calculate the relative phase using the grayscale images of the first pattern and the second pattern and the variable calculated in advance. Thus, it is possible to reduce the calculation time of the relative phase.

(2) According to another aspect of the invention, there is provided a computer program adapted to control an arithmetic device provided with a projection section adapted to project light of a predetermined pattern on a measurement object, and an imaging section adapted to take an image of the measurement object. The computer program causes a computer to realize a calculation function adapted to calculate a relative phase, and a projection execution function adapted to perform (i) sinusoidal pattern projection adapted to cause the projection section to project a first pattern and a second pattern as projection patterns having phases in a spatial frequency shifted by $\pi$ from each other and having sinusoidal luminance variation alternately in a first time period, and (ii) all-white/black pattern projection adapted to cause the projection section to project an all-white pattern as an all-white image and an all-black pattern as an all-black image alternately in a time period longer than the first time period of the sinusoidal pattern projection, wherein the projection execution function includes a function adapted to perform the sinusoidal pattern projection between projection of the all-white pattern and the all-black pattern in a certain period and projection of the all-white pattern and the all-black pattern in a subsequent period, and the calculation function includes a function adapted to obtain a grayscale image of the measurement object on which light is projected due to the sinusoidal pattern projection, and a reference image of the measurement object on which light is projected due to the all-white/black pattern projection from the imaging section to calculate a relative phase of the projection pattern at an arbitrary position in a grayscale image of the measurement object on which light of the projection pattern is projected using the grayscale image and the reference image obtained. According to this aspect, by previously calculating a variable small in variation with time using the reference image in which the all-white pattern and the all-black pattern are projected every time period of the all-white/black pattern projection, it is possible to thereafter calculate the relative phase using the grayscale images of the first pattern and the second pattern and the variable calculated in advance. Thus, it is possible to reduce the calculation time of the relative phase.

(3) In the aspect described above, it is also possible for a luminance value of the all-white pattern to be a half as high as the highest one of luminance values of the projection patterns to be projected due to the sinusoidal pattern projection. According to this aspect, it is possible to easily calculate the relative phase.

(4) In the aspect described above, it is also possible to further include a storing function adapted to previously store coordinate information in an absolute coordinate system of the measurement object calculated from a reference image as a taken image of the measurement object in which light of an arbitrary pattern is projected, and a depth shift amount calculation function adapted to calculate a shift amount of a depth of the measurement object in a case in which the relative phase is calculated with respect to the measurement object in a case in which the reference image is obtained using the coordinate information and the relative phase. According to this aspect, since the calculation time of the relative phase can be shortened, the calculation time of the shift amount of the depth can also be shortened.

(5) In the aspect described above, it is also possible to further include an absolute phase calculation function adapted to perform phase unwrapping on the relative phase at an arbitrary position to calculate an absolute phase of the projection pattern, and a three-dimensional coordinate calculation function adapted to calculate a three-dimensional coordinate in an absolute coordinate system of the measurement object from the absolute phase, wherein the projection execution function further includes a first auxiliary pattern projection function adapted to cause the projection section to project a fifth pattern group and a sixth pattern group in which a fifth pattern and a sixth pattern as auxiliary projection patterns each lower in spatial frequency than the projection pattern, each having a sinusoidal luminance variation, and shifted in phase by $\pi$ from each other are respectively set for each of the spatial frequencies, and a second auxiliary pattern projection function adapted to cause the projection section to project a seventh pattern group and an eighth pattern group respectively shifted in phase by $\pi/2$ from the fifth pattern group and the sixth pattern group, and shifted in phase by $\pi$ from each other, and the absolute phase calculation function includes a function adapted to calculate the absolute phase using the grayscale image and auxiliary grayscale images of the measurement object on which light is projected due to the first auxiliary pattern projection function and the second auxiliary pattern projection function. According to this aspect, it is possible to easily calculate the absolute phase using the absolute phase calculation function.

(6) In the aspect described above, it is also possible to further include an absolute phase calculation function adapted to perform phase unwrapping on the relative phase at an arbitrary position to calculate an absolute phase, and a three-dimensional coordinate calculation function adapted to calculate a three-dimensional coordinate of the measurement object from the absolute phase, wherein the projection execution function further includes an auxiliary pattern projection function adapted to cause the projection section to project a fifth pattern group and a sixth pattern group in which a fifth pattern and a sixth pattern as auxiliary projection patterns each lower in spatial frequency than the projection pattern, each having a sinusoidal luminance variation, and shifted in phase by $\pi$ from each other are respectively set for each of the spatial frequencies, and the absolute phase calculation function includes a function adapted to calculate the absolute phase using the grayscale image, the reference image, and an auxiliary grayscale image of the measurement object on which light is projected due to the auxiliary pattern projection function. According to this aspect, it is possible to easily calculate the absolute phase using the absolute phase calculation function.

The invention can be implemented in a variety of aspects other than the computer program. Besides the computer program, the invention can be implemented as the aspects of, for example, an arithmetic device, a method of controlling an arithmetic device, and a non-temporary recording medium on which the computer program is recorded.

The entire disclosure of Japanese Patent Application No. 2018-046322, filed on Mar. 14, 2018 is expressly incorporated by reference herein.

What is claimed is:

1. A method for controlling an arithmetic device including a projection section adapted to project light of a projection pattern having a sinusoidal luminance variation on a measurement object, and an imaging section adapted to take an image of the measurement object, the method comprising:
    calculating a relative phase of the projection pattern at an arbitrary position in a grayscale image of the measurement object on which the light of the projection pattern is projected, the grayscale image being taken by the imaging section; and
    performing
        (i) first pattern projection adapted to cause the projection section to project a first pattern and a second pattern as the projection pattern having phases in a spatial frequency shifted by $\pi$ from each other alternately in a first time period, and
        (ii) second pattern projection adapted to cause the projection section to project a third pattern and a fourth pattern as the projection pattern having phases in the spatial frequency shifted by $\pi/2$ from the first pattern and the second pattern, the phases of the third pattern and the fourth pattern being shifted by $\pi$ from each other, alternately in a second time period longer than the first time period,
    wherein the performing (i) the first pattern projection and (ii) the second pattern projection includes performing the first pattern projection between projection of the third pattern and the fourth pattern in a certain period and projection of the third pattern and the fourth pattern in a subsequent period, and
    the calculating the relative phase includes obtaining a grayscale image of the measurement object on which the light is projected due to the first pattern projection and a grayscale image of the measurement object on which the light is projected due to the second pattern projection from the imaging section to calculate the relative phase using the grayscale images obtained.

2. The method for controlling an arithmetic device according to claim 1,
    previously storing coordinate information in an absolute coordinate system of the measurement object calculated from a reference image as a taken image of the measurement object in which light of an arbitrary pattern is projected; and
    calculating a shift amount of a depth of the measurement object in a case in which the relative phase is calculated with respect to the measurement object in a case in which the reference image is obtained using the coordinate information and the relative phase.

3. The method for controlling an arithmetic device according to claim 1,
    performing phase unwrapping on the relative phase at an arbitrary position to calculate an absolute phase of the projection pattern; and
    calculating a three-dimensional coordinate in an absolute coordinate system of the measurement object from the absolute phase,
    performing a first auxiliary pattern projection to project a fifth pattern group and a sixth pattern group in which a fifth pattern and a sixth pattern as auxiliary projection patterns each lower in spatial frequency than the projection pattern, each having a sinusoidal luminance variation, and shifted in phase by $\pi$ from each other are respectively set for each of the spatial frequencies, and a second auxiliary pattern projection to project a seventh pattern group and an eighth pattern group respectively shifted in phase by $\pi/2$ from the fifth pattern group and the sixth pattern group, and shifted in phase by $\pi$ from each other, and
    calculating the absolute phase using the grayscale image and auxiliary grayscale images of the measurement object on which light is projected due to the first auxiliary pattern projection function and the second auxiliary pattern projection function.

* * * * *